Figure 1:
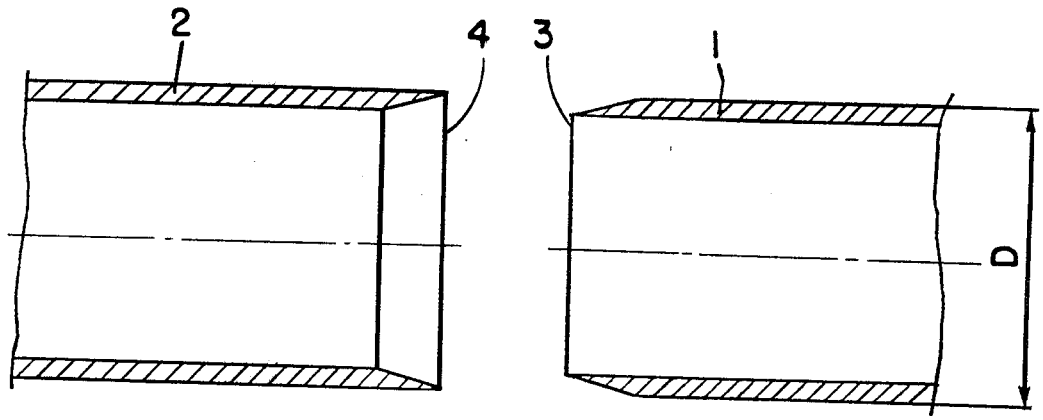

United States Patent [19]

Colas

[11] 4,302,874

[45] Dec. 1, 1981

[54] METHOD OF FORMING PIPE UNION

[75] Inventor: Francois Colas, Bourg-la-Reine, France

[73] Assignee: Cegedur Societe de Transformation de l'Aluminium Pechiney, Paris, France

[21] Appl. No.: 98,129

[22] Filed: Nov. 28, 1979

[30] Foreign Application Priority Data

Dec. 13, 1978 [FR] France ................................ 78 35615

[51] Int. Cl.³ ............................................. B23P 19/00
[52] U.S. Cl. ..................................... 29/426.6; 29/458; 29/525
[58] Field of Search ...................... 29/426.5, 458, 525, 29/426.6; 285/399, 382

[56] References Cited

U.S. PATENT DOCUMENTS 2,273,154  2/1942  Stromsoe ...................... 29/458 UX
3,308,524  3/1967  Moyer .............................. 29/458 X

FOREIGN PATENT DOCUMENTS 739854   8/1966  Canada ................................ 285/399
646574  11/1928  France ................................ 285/382
2356463  1/1978  France ................................ 29/525
435700   9/1935  United Kingdom ................ 29/525

Primary Examiner—Charlie T. Moon
Attorney, Agent, or Firm—McDougall, Hersh & Scott

[57] ABSTRACT

The invention relates to a method for quickly joining pipes by chamfering the end of a thin pipe, forcefully socket jointing this pipe in a pipe of the same diameter, dismantling the two pipes by traction. The two pipes can thereafter be rejoined easily and quickly by socket-jointing.

5 Claims, 3 Drawing Figures

METHOD OF FORMING PIPE UNION

This invention relates to a method for quickly and easily joining pipe ends.

It is known to join pipes having identical dimensions and relatively thin walls, such as those of the so-called "gas" type, by forcefully socket jointing one pipe inside the other after profiling one of the pipes to facilitate socket jointing. In French Patent Application No. 76.20956, published on Jan. 27, 1978 as French Pat. No. 2.356.463, description is made of a method in which the pipe end adopted as a spigot or male member is chamfered, the end of this pipe is forcefully socket jointed into the end portion of a second pipe, which is firmly gripped in an undeformable die, over a length which is at least equal to the desired length of penetration by the first pipe. The length of penetration is generally at least equal to the external diameter of the pipes. The pipe acting as the socket or female member cannot therefore expand and, on the contrary, compels the end of the other pipe to contract along the socket jointing length. A particularly strong union with a constant external diameter, even in the zone where the pipes are fitted into each other, is thus obtained.

To improve the appearance of the union and to facilitate the initial engagement of the two pipes into each other, a conical bore is usually provided in the end of the female section.

It is also known from the aforementioned application that the chamfer of the spigot changes during the initial socket jointing operation into a convergent nozzle which corresponds in a gradual slope to the internal wall of the socket.

This method can be adopted to make a definitive union. It has been found that it can also be used as a method of preparing a subsequent union which is less strong but which can be produced very easily even by inexperienced personnel, without special tools.

For this purpose, the two pipes which have been joined beforehand by the forceful socket jointing of one tube into the other by the method described are separated by traction. The socket joining operation, followed by the separating operation, produces two ends which strictly match each other over the socket jointing length and, owing to the elasticity of the metal, the spigot or male member, which is no longer held by the socket, expands very slightly. Similarly, the socket contracts very slightly when it is freed. There is a very slight negative clearance owing to the elastic retraction between the external diameter of the spigot and the internal diameter of the socket over the socket jointing length. The pulling effort needed for separation is of the same magnitude as the effort needed for the initial socket jointing.

The two pipes can, however, be re-joined very easily in situ by union effected by means of a few mallet strokes, that is to say by applying a fairly high stress of short duration. Rejoining is simple due to the fact that, on the one hand, the negative clearance between the spigot and socket along the socket jointing length is very small and, on the other hand, the end of the socket widens slightly in the form of a conical bore, as shown in the figures. A very strong union which can be produced by personnel having no technical skill and without special tools is thus obtained. Final rejoining can be effected with no particular effort. The tensile stress for separation of the rejoined pipes can easily be higher than half that of the initial union.

An even stronger final union can be obtained by depositing a thin coat of paint on the contracted portion of the spigot along the socket jointing length while leaving the end portion unpainted over a few millimeters so that it slips in more easily.

When joining aluminum pipes, the strength of the union is improved by superficial anodization of the spigot pipe.

A union having the same characteristics as the initial union is thus obtained.

Figure 2:
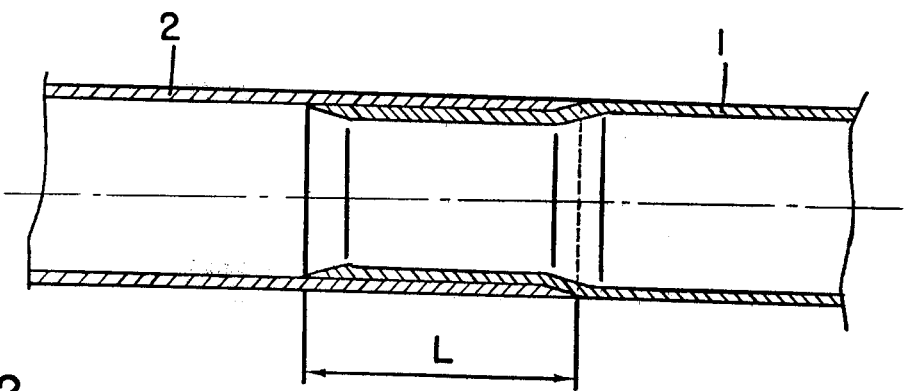
Figure 3:
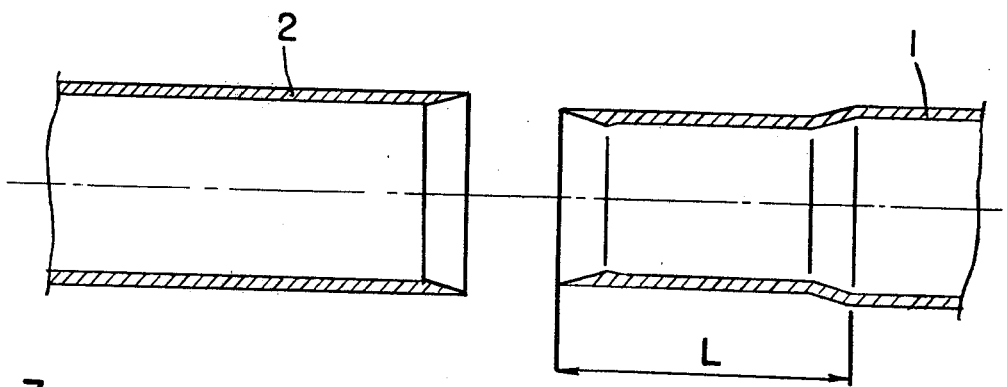

For purposes of illustration, but not of limitation, an embodiment of the invention is shown in the accompanying drawings, in which FIG. 1 is a sectional view of two pipes having identical dimensions prior to initial joining;

FIG. 2 is a sectional view of the two pipes joined by a forceful socket jointing; and FIG. 3 is a sectional view of the two pipes separated by traction.

FIG. 1 shows two aluminum pipes 1 and 2, whose ends are 14/16 mm in diameter, prepared for the forceful socket jointing operation.

The end 3 of the spigot portion 1 is chamfered, while the end 4 of the socket portion 2 is conically bored.

FIG. 2 shows the ends of the two pipes 1 and 2 which have been forcefully socket jointed into each other over a length of approximately 20 mm by the method described in the aforementioned French application. It is seen that the external diameter D of the two pipes remains substantially constant, even at the level of their reciprocal socket jointing.

FIG. 3 shows the ends of the two pipes 1 and 2 which have been separated by traction, whereby withdrawal of the spigot 1 is contracted to a reduced outer wall to wall diameter over a length L of 20 mm. The portion of the two pipes have dimensions which match each other closely over the length L. As heretofore explained, there is however a slight negative clearance between the external diameter of the spigot 1 and the internal diameter of the socket 2 over their socket jointing length. After the separation, the metal is elastically relaxed. However, the two pipes can be socket jointed again very easily by hand over a length of approximately 10 mm owing to the enlargement of the end of the socket 2, as shown in FIGS. 2 and 3. Two or three mallet or hammer impacts are needed to socket joint them again over a length of 20 mm. This can be performed easily, even with the most rudimentary tools.

The resultant union has a tensile stress which can be of the order of 90% of the initial union. This union is not shown since the showing would be identical to FIG. 2.

An even stronger union can be obtained by merely coating the exterior of the contracted portion of the spigot 1 with a thin layer of paint. To make it easier to insert the spigot, the pipe is not painted all the way to the end. An unpainted ring is left so that there is no extra thickness for three to four millimeters from the end. The tensile stress will be of substantially the same magnitude as that of the initial union.

Particularly noteworthy results have also been obtained by the use of aluminum pipes having anodized surfaces as spigots. The tensile stress of the union is far better.

The tensile stress is approximately proportional to the length of the cylindrical portion of the socket jointing, the spigot being elastically hooped or telescoped in a manner of speaking, in the socket. Unions which can be as strong as desired can thus be very simply produced.

The optimum angle of the chamfer initially made on the spigot as well as that of the conical bore of the socket, that is to say the angle of the conical ends of the tubes with their respective axes, is of the order of about 7°.

I claim:

1. A method of joining two standard pipes originally having identical dimensions and walls which are comparatively thin relative to their diameter, wherein the pipes have previously been subjected to the steps of forcefully socket jointing the end of one of the pipes within the end of the other over a length which is at least equal to its diameter, while gripping the end of the other pipe in an undeformable die over the socket jointing length, separating by traction the jointed ends whereby the two ends interfit one within the other except for differences in diameter due to elastic retraction upon separation, subsequently rejoining the two ends over the initial socket jointing length by insertion of one end into the other and applying a socket jointing force of short duration to overcome the difference in the diameter of the two ends due to the elastic retraction.

2. A method according to claim 1, characterized in that, before rejoining the two pipes a thin layer of paint is deposited on the surface of the end portion of the one pipe, while leaving an unpainted ring at the end.

3. A method according to claim 1, characterized in that the other pipe is an aluminum pipe having an anodized surface.

4. A method according to claim 1, characterized in that the ends of the pipes are socket jointed over a length proportional to the desired tensile stress.

5. A method according to claim 1, characterized in that, prior to initial socket jointing, the end of the one pipe is chamfered and the end of the other pipe is conically bored at an angle of the order of 7° relative to the respective axis of these pipes.

* * * * *